United States Patent [19]
Lawless et al.

[11] Patent Number: 4,599,677
[45] Date of Patent: Jul. 8, 1986

[54] CAPACITIVE ENERGY STORAGE DEVICE FOR USE AT CRYOGENIC TEMPERATURES

[76] Inventors: William N. Lawless; C. Frederick Clark, Jr., both of c/o CeramPhysics, Inc., P.O. Box 346, Westerville, Ohio 43081

[21] Appl. No.: 616,508

[22] Filed: Jun. 1, 1984

[51] Int. Cl.[4] .............. H01G 4/12; C04B 35/46
[52] U.S. Cl. .................. 361/321; 252/521; 501/134
[58] Field of Search ............ 361/321; 264/61; 252/521; 501/134–137

[56] References Cited

U.S. PATENT DOCUMENTS

| | | |
|---|---|---|
| 2,805,165 | 9/1957 | Goodman . |
| 3,649,891 | 3/1972 | Lawless . |
| 3,681,262 | 8/1972 | Bouchard et al. ............ 252/521 X |
| 4,283,752 | 8/1981 | Layton ............................ 361/321 |
| 4,377,840 | 3/1983 | Nair ............................ 501/134 X |
| 4,482,935 | 11/1984 | Wheeler ........................ 501/136 X |
| 4,525,768 | 6/1985 | Wheeler ........................ 252/521 X |

OTHER PUBLICATIONS

Lawless, "Capacitive Energy Storage at 77K in a Titanate Glass–Ceramic", Proceedings of the XIIIth International Congress of Refrigeration, Washington, DC, 1971, vol. 1, pp. 599–603.
Lawless, "Specific Heats of Lead and Cadmium Niobates at Low Temperatures", Physical Review, vol. 19, No. 7, Apr. 19, 1979, pp. 3755–3760.
Clarke et al, "Quantum–Ferroelectric Pressure Sensor", Ferroelectrics, 1983, vol. 50, pp. 257–262.

*Primary Examiner*—Donald A. Griffin
*Attorney, Agent, or Firm*—Killworth, Gottman, Hagan & Schaeff

[57] ABSTRACT

A capacitive energy storage device is provided utilizing a ferroelectric pyrochlore ceramic material as the dielectric. The preferred ceramic material has the formula:

$$(Cd_{1-x}Pb_x)_2(Nb_{1-y}Ta_y)_2O_7,$$

where x and y are numbers in the range of from 0 to 1. Other ceramic materials used in the invention are the non-pyrochlore ceramic material $(Sr_{1-a}Ba_a)TiO_3$ or the non-pyrochlore ceramic material $(Pb_{1-b}Ni_b)_3MgNb_2O_9$. These ceramic materials exhibit large dielectric constants at temperatures in the range of 50°–90° K.

8 Claims, 2 Drawing Figures

CAPACITIVE ENERGY STORAGE DEVICE FOR USE AT CRYOGENIC TEMPERATURES

BACKGROUND OF THE INVENTION

The present invention relates to capacitive energy storage devices for use at cryogenic temperatures, and in particular to the use of ferroelectric ceramic materials in such capacitive storage devices.

Storing energy in banks of capacitors at room temperature is commonly used in applications where size or weight has not been a major concern. Such capacitor technology is quite advanced. However, where the size and weight of the capacitive energy storage devices are of significance and are desired to be minimized, and where rapid discharge is desired, there are potential benefits to be obtained by capacitive energy storage at cryogenic temperatures.

These potential benefits are due to the fact that dielectric breakdown field strengths of dielectric materials used in capacitors are generally much larger at low temperatures than at room temperatures. Also, the dissipation factor for such dielectric materials generally decreases with decreasing temperature so that dielectric heating is reduced in charge-discharge operations. The dissipation factor is a measure of internal power losses due to electronic conduction through the dielectric. This power loss results in the thermal dissipation of electrical energy which is undesirable because it raises the temperature of the device and degrades its efficiency. Finally, the resistivity of metals falls rapidly with decreasing temperature so that Joule heating in metal components is reduced during discharge at cryogenic temperatures. In capacitive energy storage devices, the Helmholtz free energy density of the dielectric is an important quantity. The larger the Helmholtz free energy density of the dielectric, the greater the energy per unit volume which can be stored. The Helmholtz free energy density is defined by the following equation:

$$\Delta F = \frac{1}{8\pi} \int_0^{E_c^2} \epsilon dE^2 (cgs), \qquad \text{Equation 1}$$

where F is the Helmholtz free energy, is the dielectric constant of the material, E is the electric field strength, and $E_c$ is the upper limit of electric field strength.

Some studies of capacitive energy storage at cryogenic temperatures have been published. One study dealt with the impregnation of dielectric films with liquid nitrogen or polar liquids. K. N. Mathes and S. H. Minnich, "Cryogenic Capacitor Investigation," Final Report, S-67-1095, May 1965. Three types of materials were investigated at 77 K, and it was concluded that energy densities of approximately 0.6 J/cm$^3$ were possible. Energy density may be defined as the energy per unit volume of a medium.

The use of strontium titanate glass ceramic materials as capacitive energy storage devices at cryogenic temperatures was reported by Lawless, Proc. XIII Int'l. Congress of Refrigeration, Washington, D.C., 1971, Vol. 1, p. 599. Based on measurements of electric field strength and dielectric breakdown at 77 K, it was concluded that energy densities of approximately 5.0 J/cm$^3$ were possible.

However, there is a need in the art for materials which can be used as capacitive energy storage devices and which have even greater energy densities. The size and weight of capacitive energy storage devices could be reduced providing portability to devices which have been heretofore too large and bulky to be mobile. For example, high powered lasers require massive capacitor banks which are too large and heavy to be moved easily. Capacitive devices having large energy densities could reduce the necessary bulk of the capacitors presently utilized in such applications.

SUMMARY OF THE INVENTION

The present invention provides capacitive energy storage devices utilizing a preferred ferroelectric pyrochlore ceramic material ($A_2B_2O_7$) as the dielectric. That ceramic material has the formula:

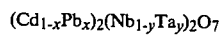

$$(Cd_{1-x}Pb_x)_2(Nb_{1-y}Ta_y)_2O_7$$

where x and y are numbers in the range of from 0 to 1. In preferred embodiments of the invention, x has a value between about 0.15 and 0.30, and y has a value between about 0.3 and 0.7, and most preferably about 0.5.

Additionally, other compositions useful in the practice of the present invention are the non-pyrochlore material $(Sr_{1-a}Ba_a)TiO_3$ where a ranges 0 to 0.5 or the non-pyrochlore material $(Pb_{1-b}Ni_b)_3MgNb_2O_9$ where b ranges 0 to 1.

The ceramic materials of the present invention possess unusually large dielectric constant at temperatures in the range of from 50–90 K. Likewise, capacitors made with the ceramic materials of the preferred embodiment of the present invention possess large energy densities of approximately 20–25 J/cm$^3$ at temperatures near 77 K (the temperature of liquid nitrogen). It is believed that these energy densities are four to five times as great as any materials previously reported.

A further advantage of the ceramic materials of the present invention is that upon capacitive discharge, the ceramic materials undergo electrocaloric cooling which compensates for heating effects caused by thermal energy dissipation in the capacitive energy storage device. The ceramic materials of the present invention may be readily fabricated into multilayer capacitors utilizing tape casting techniques known in the art.

Yet a further advantage of utilizing the ceramic materials of the present invention in capacitive energy storage devices is that the reduction in size of such devices made possible by the present invention would also enable crisper discharge of such devices. This is due to the ability to reduce the RC time constant of such devices by reducing the resistances of the metal interconnects between capacitor banks and by reducing the number and total lengths of such interconnects.

Accordingly, it is an object of the present invention to provide a capacitive energy storage device for use at cryogenic temperatures having a large energy density. This and other objects and advantages of the invention will be apparent from the following detailed description, the accompanying drawings, and the appended claims.

DETAILED DESCRIPTION OF THE PREFERRED EMBODIMENTS

The Helmholtz free energy equation, Equation 1 above, indicates that in order to optimize F, the free energy density, both the upper limit of electric field strength, $E_c$, and the dielectric constant of a material $\epsilon$, should be as large as possible. Lowering the temperature of a dielectric material will permit increases in the upper limit of electric field strength, $E_c$. Thus, operation at cryogenic temperatures in the range of 50-90K will permit larger $E_c$ values. A preferred temperature of operation of the device of the present invention is at or near 77 K, the temperature of liquid nitrogen. Liquid nitrogen is inexpensive, readily available, and has a large specific heat in comparison with liquid helium. Of course, operation at other cryogenic temperatures is possible by modifying the composition of the ceramic material used in the present invention as explained in greater detail below.

The preferred pyrochlore ferroelectric ceramic $Cd_2NB_2O_7$ has a large dielectric constant ($\epsilon$) over the temperature range of 150-250 K, with $\epsilon_{max}$, the maximum value of dielectric constant, occurring at 185 K.

Figure 1:
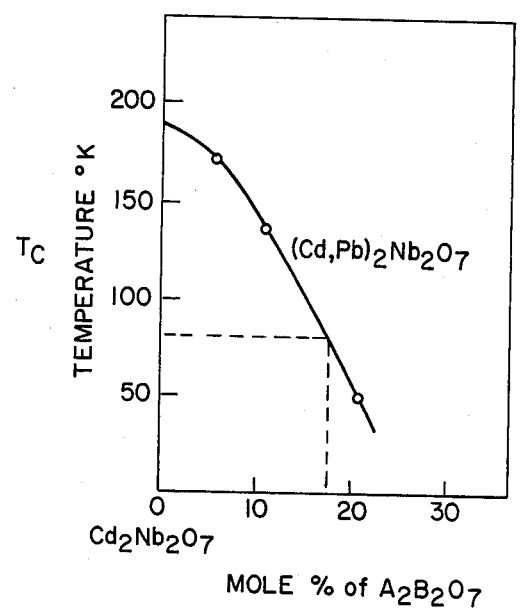
FIG. 1 is a graph of transition temperature versus mole % of Pb as it affects transition temperature, $T_c$, as defined below, of $Cd_2Nb_2O_7$.

This temperature, at which $\epsilon_{max}$ occurs, is designated the transition temperature, $T_c$. By substituting Pb on the Cd site or Ta on the Nb site, this transition temperature can be lowered into the range of 50-90 K. FIG. 1 illustrates the suppression of $T_c$ in $Cd_2Nb_2O_7$ by substitution of Pb at the Cd site. For example, as shown in FIG. 1, the substitution of 17 mole % Pb at the Cd site lowers the transition temperature, $T_c$, of the composition to 70 K.

Surprisingly, we have found that for the ceramic materials of the preferred embodiment of the present invention, the lowering of the transition temperature does not adversely affect the maximum value of the dielectric constant, $\epsilon_{max}$. For example, for most ferroelectric materials, as $T_c$ is lowered, $\epsilon_{max}$ is also lowered. In fact, we have found that while $\epsilon_{max}$ for $Cd_2Nb_2O_7$ is about 5000 at 185 K, the Pb-substituted composition, with a $T_c$ in the range of 50-90 K, has an $\epsilon_{max}$ in the range of 15000-16000.

We have discovered that additional operational advantages may be obtained by further modifying the ceramic material of the preferred embodiment of the present invention by substitution of Pb at the Cd site and/or substitution of Ta at the Nb site, or both. By lowering the transitional temperature, $T_c$, of the composition somewhat below the desired operating temperature of the device, for example, 77 K, the effects of charging the device can be compensated for. That is, generally the effect of a charging electric field on a ferroelectric material is to shift $T_c$ upwards. By modifying the ceramic material, the upward shift in $T_c$ with E would optimize the intergral in Equation (1) at 77 K because $\epsilon_{max}$ would "sweep" through this temperature.

Another advantage in using the ceramic material of the present invention and modifying it so that $T_c$ is somewhat below the desired operating temperature of the capacitive energy storage device is that upon discharge of the device, the ceramic material cools because of the phenomenon of adiabatic depolarization. That is, since $\partial\epsilon/\partial T$ is negative if $T_c < 77$ K, the effect of decreasing E is to cause the temperature of the material to drop, as demanded by thermodynamics. This cooling effect acts as a thermal sink for the heating phenomena associated with discharge (thermal dissipation), and in particular with Joule heating in the thin metal electrodes embedded in the ceramic multilayers.

The ceramic material used in the preferred embodiment of the present invention may be prepared as follows. Ceramic powders of CdO, $Nb_2O_5$, PbO, and $Ta_2O_5$ are mixed in the appropriate ratios by ball-milling in water or alcohol. The mixed, dried powders are calcined at about 900° C., and re-milled following calcination. These reacted powders are then sintered at 1200°-1400° C. for one hour into the desired shapes. The other ceramic materials of the present invention may be prepared in an analogous manner.

The ceramic materials of the present invention can be formed into a multilayered ceramic capacitor utilizing tape casting techniques known in the art. "Tape casting" refers to the known procedures for forming a multilayered body having appropriate metal electrodes interdispersed between ceramic layers. Such ceramic layers may be formed by mixing powdered ceramic material with an appropriate organic binder and preparing a thin film sheet. The sheets may be stacked and pressed in a known manner followed by binder burnout and sintering.

For a typical procedure, the calcined ceramic powders of the preferred embodiment of the present invention are cast into sheets about 0.001-0.010 inch thick using any one of several available organic binders. After stacking with appropriate, silk-screened electrode patterns, the stacks are pressed and fired according to the following schedule: the organic binder is burned out at 400°-500° C. for 1-5 hours, followed by sintering of the sheets at 1200°-1400° C. for 1-24 hours. Optionally, pressure may be applied to the sheets during the sintering step.

Figure 2:
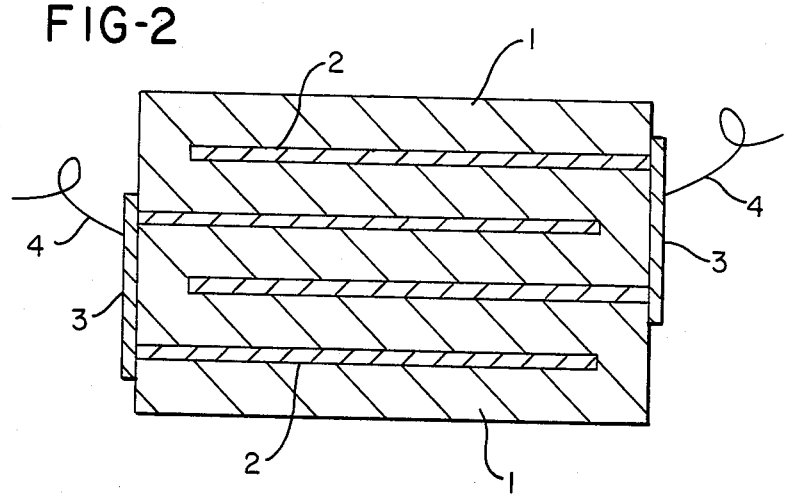
FIG. 2 is a schematic diagram of a typical capacitor structure which may be used in the practice of the present invention.

A typical capacitor structure utilizing the ceramic materials of the present invention is illustrated in FIG. 2. A multilayer, energy-storage device in accordance with the present invention comprises ceramic layers 1 with interleafing metal electrodes 2. Electroding metal caps 3 make electrical contact to the electrodes 2 and to the hook-up wires 4. Upon electrical discharge, the energy stored in the ceramic layers 1 is released to the connecting wires 4 via the electrodes 2 and end terminations 3 as a large electromagnetic pulse. While the device illustrated in FIG. 2 is shown with only a few layers for simplicity and ease of understanding, it will be apparent to those skilled in the art that many more layers may be built up in accordance with these teachings to form more complex multilayered capacitive energy storage devices.

While the apparatus herein described constitutes preferred embodiments of the invention, it is to be understood that the invention is not limited to this precise apparatus, and that changes may be made without departing from the scope of the invention, which is defined in the appended claims.

What is claimed is:

1. A capacitive energy storage device for use at cryogenic temperatures comprising first and second electrodes having a layer of dielectric material therebetween, said dielectric material consisting essentially of a pyrochlore ferroelectric ceramic having the formula:

$(Cd_{1-x}Pb_x)_2(Nb_{1-y}Ta_y)_2O_7$ where x and y are numbers in the range of from 0 to 1.

2. The capacitive energy storage device of claim 1 in which x is between 0.15 and 0.30.

3. The capacitive energy storage device of claim 1 in which y is between 0.3 and 0.7.

4. The capacitive energy storage device of claim 1 in which x is between 0.17 and 0.20.

5. The capacitive energy storage device of claim 1 in which y is 0.50.

6. The capacitive energy storage device of claim 1 in which the transition temperature, $T_c$, of said dielectric material is below the predetermined operating temperature of said device.

7. The capacitive energy storage device of claim 1 in which the maximum value for dielectric constant, $\epsilon_{max}$, of said dielectric material occurs in the temperature range of from 50 to 90 K.

8. A capacitive energy storage device for use at cryogenic temperatures comprising first and second electrodes having a layer of dielectric material consisting of a non-pyrochlore ceramic material having the formula: $(Sr_{1-a}Ba_a)TiO_3$, where a ranges 0 to 0.5 or the non-pyrochlore ceramic material $(Pb_{1-b}Ni_b)_3MgNb_2O_9$ where b ranges 0 to 1.

* * * * *